United States Patent [19]

Hayashi et al.

[11] 4,279,580
[45] Jul. 21, 1981

[54] APPARATUS FOR MAKING BIAXIALLY STRETCHED TUBULAR FILMS

[75] Inventors: Kohtaro Hayashi, Yamanashi; Ko Morihara, Chibashi; Kohji Nakamura, Chibaken, all of Japan

[73] Assignee: Chisso Corporation, Tokyo, Japan

[21] Appl. No.: 105,227

[22] Filed: Dec. 19, 1979

[30] Foreign Application Priority Data

Feb. 25, 1978 [JP] Japan ................ 53-159455

[51] Int. Cl.³ .................. B29D 23/04; B29F 3/08
[52] U.S. Cl. .................................. 425/72 R; 264/566; 264/567; 264/290.2; 425/73; 425/326.1; 425/384; 425/387.1; 425/388; 425/445
[58] Field of Search .............. 425/387.1, 326.1, 384, 425/72, 73, 388 R, 445; 264/290.2, 563–564, 566–567, 565

[56] References Cited

U.S. PATENT DOCUMENTS

| 3,296,352 | 1/1967 | Riggs | 264/564 |
|---|---|---|---|
| 3,492,386 | 1/1970 | Ohmasa et al. | 264/566 |
| 3,860,380 | 1/1975 | Upmeier | 425/326.1 |
| 3,904,342 | 9/1975 | Sato et al. | 425/387.1 |
| 3,980,418 | 9/1976 | Schott, Jr. | 425/326.1 |
| 3,985,849 | 10/1976 | Notomi et al. | 264/567 |
| 4,112,034 | 9/1978 | Nash et al. | 264/565 |

FOREIGN PATENT DOCUMENTS 49-18629  3/1974  Japan .
52-128969 7/1977  Japan .

Primary Examiner—Jeffery R. Thurlow
Attorney, Agent, or Firm—Fred Philpitt

[57] ABSTRACT

An apparatus for producing biaxially stretched tubular films which enables heating air for stretching to pass uniformly around the circumference of a stretching bubble thereby to effect stabilized operation. Said apparatus comprises ① a circular hood fitted to the section where a loaded raw film starts stretching and a formed stretching bubble expands to its maximum diameter, ② holders for a plurality of rolls, which holders are mounted on the lower part of said hood, said rolls being held each on the end of said holders which an elasticity allowing swinging of said rolls only in the direction radial to the central axis of said bubble but resistant to being distorted in the direction of circumference of said stretching bubble, and ③ a flexible and shrinkable cylindrical sheet attached to and along the inside lower surface of said hood, the lower end of said sheet being situated immediately above the roll part of said holders.

1 Claim, 5 Drawing Figures

APPARATUS FOR MAKING BIAXIALLY STRETCHED TUBULAR FILMS

FIELD OF THE INVENTION

This invention relates to an apparatus for producing biaxially stretched tubular films. More particularly, it relates to an apparatus which permits passage of heated air, uniformly along the circumference of a stretching bubble when a tubular film (hereinafter referred to as a raw film) consisting of a thermoplastic synthetic resin is to be biaxially stretched simultaneously in both the longitudinal and transversal directions. It has been found that stabilized biaxially stretched tubular films can always be produced by making uniform the amounts of air currents passed, such as a descending air current in case of blown hot air heating for stretching, an ascending air current caused by convection in the case of radiation heating or an air current caused by suction of surrounding air, etc. over the entire circumference of the bubble at a position close to a stretching point thereof. This invention relates to a novel apparatus by which the practice of such a process can be made.

DESCRIPTION OF THE PRIOR ART

In general, if the well known apparatus for making biaxially stretching film is used (hereinafter referred to simply as apparatus) in the case where a raw film is heated to a suitable temperature lower than its melting point to effect biaxial stretching by blowing pressurized air into the inside of these tubular films in a biaxial stretching process of tubular films, uniform heating is not feasible, since a blown current of heating air (abbreviated hereinafter to air current) or the suction of surrounding air at the time of convection, in the neighbourhood of the stretching point, does not become uniform along the circumference of a bubble; hence continuation of stabilized film production becomes difficult.

As for methods which have been conventionally tried to overcome this, methods for overcoming unstable film production due to non-uniformity of heating have been attempted such as the one in which a plurality of guide rolls are provided along the circumference of a raw film fitted to an apparatus or a bubble to stabilize said raw film or said bubble and thereby effect uniform heating or the other in which a hood-like soldier's helmet, made from e.g. cloth is provided at the stretching part to stabilize forcibly stretching.

However, these methods have not been sufficient. Namely even when a plurality of guide rolls are provided along the circumference of a raw film or a bubble fixed to an apparatus during a course of biaxial stretching, there is no effectiveness in the control of air current, and in case of provision of a hood-like soldier's helmet, injuries are formed continuously on the surface of a bubble due to the contact of a cloth with the bubble and the value of such films is remarkably reduced.

We feel we have succeeded in overcoming the above-mentioned problems with the present invention.

SUMMARY OF THE INVENTION

This invention resides in the following:

(1) An apparatus for producing biaxially stretched tubular films characterized in that there are provided ① a circular hood fitted to the section where a loaded raw film starts stretching and a formed stretching bubble expands to a maximum diameter; ② a plurality of roll holders each fixed onto the lower part of said hood, and rolls held on the lower tip end of said roll holders, said roll holders allowing swing of said rolls only in the radial direction with respect to the central axis of said bubble, but having an elasticity by which said roll holders are difficult to distort with respect to the circumferential direction of said stretching bubble; and ③ a flexible and shrinkable cylindrical sheet attached to and along the inside lower surface of said hood, the lower end of said sheet being located above the roll parts of said roll holders.

(2) An apparatus according to the above-mentioned item (1) wherein the lower end of the sheet attached to and along the inside of said hood is fastened onto a part close to the roll-holding positions of said roll holders.

(3) An apparatus according to the above-mentioned item (1) wherein the lower end of the sheet attached to and along the inside of said hood is pressed to contact a part close to the roll-holding positions of said roll holders by connection of said sheet with said roll holders or by an expansion ring fastened onto the inside of said sheet.

(4) An apparatus according to any one of the above-mentioned items 1 to 3 wherein the distance between the stretching bubble and the lower end of the cylindrical sheet is arranged to be kept at an approximately constant and uniform value by an interlocking expansion or shrinkage of said lower end with said roll-holding parts of said roll holders which causes said rolls of said roll holders to contact with the stretching bubble.

The apparatus of the present invention will be explained more fully referring to appended drawings.

BRIEF EXPLANATION OF THE DRAWINGS

FIG. 1b shows a cross-sectional view of A—A part of FIG. 1a.

PREFERRED EMBODIMENT OF THE INVENTION

Figure 1A:
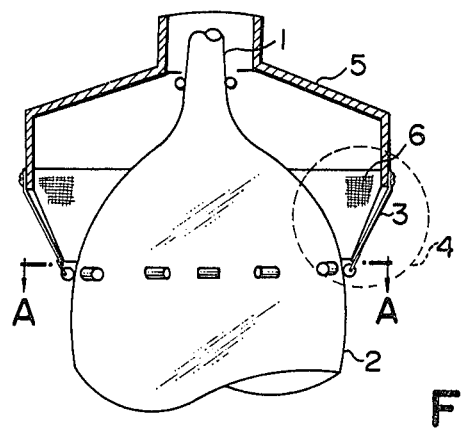
FIG. 1a shows a partial vertically cross-sectional view of the principal part of the apparatus of the present invention.
Figure 1B:
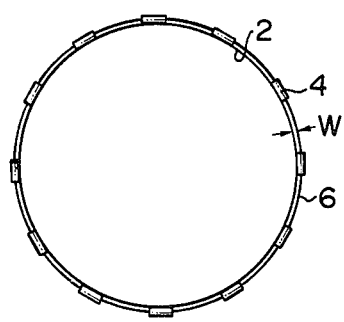
Figure 1C:
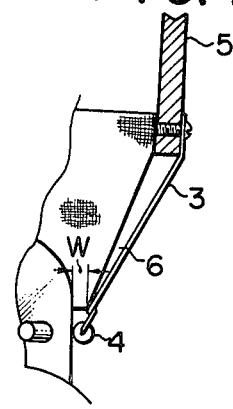
FIG. 1c shows an enlarged view of a part of FIG. 1a encircled by a dotted line.
Figure 2A:
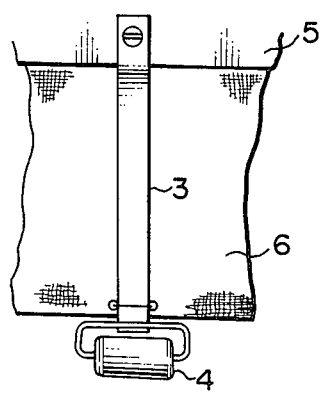
FIG. 2a and FIG. 2b show views illustrating the fastening relation between a cylindrical sheet and roll holders.
Figure 2B:
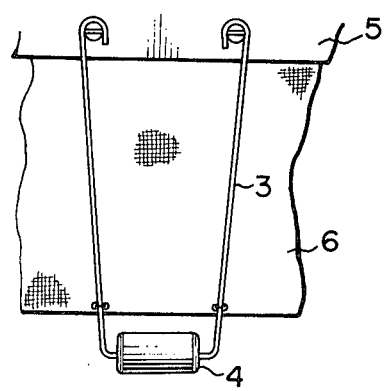

In FIG. 1a which is a partial vertically cross-sectional view of the apparatus of the present invention (but the bubble part and rolls are shown as they are), a raw film 1 heated up to a stretching temperature is arbitrarily stretched in the longitudinal direction by the difference in the circumferential velocity between feed rolls and take-up rolls (both not shown), simultaneously with the expansion up to a predetermined size by blowing of pressurized air. At this time, a bubble 2 is supported by a group of a plurality of rolls 4 which are held by roll holders 3 made of a distortion-resistant spring material; can move only in the radial direction to the central axis of said bubble; and spaced along the circumference of said bubble. This relation is clear from FIG. 1b which is the vertically cross-sectional view of A—A part of FIG. 1a (but the roll-holding part is not shown). Good result is obtained for stabilizing the bubble if the inside diameter of a circle formed by this group of rolls is set in advance so as to become somewhat smaller than the maximum diameter of the bubble, and the contact position of rolls 4 with the bubble 2 is set immediately before the position where the bubble reaches its maximum diameter. A flexible and elastic cylindrical sheet or cloth 6 (hereinafter referred to simply as cylindrical sheet) is provided inside a circular hood 5 and the roll holders 3 fixed onto the lower part of said circular hood, over the entire circumference; the upper end of the cylindrical sheet 6 is sealingly fixed to the inside of the lower part of the circular hood 5 so as not to allow any gap; and the lower end part of said cylindrical sheet is fixed by pressing contact or fastening to a position close to rolls 4 fixed onto each of roll holders 3 spaced along the circumference of said bubble. Such a relation is clear from the FIG. 1c which is a partial enlarged view of the part encircled by dotted line of FIG. 1a in addition to FIGS. 1a and 1b. As seen from the foregoing, only rolls 4 contact the bubble 2 and the gap W (see FIG. 1c) between the outer surface of the bubble 2 and the lower end part of the cylindrical sheet 6 becomes uniform over the entire circumference of the bubble relative to the contact part of said rolls irrespective of size and modification of the bubble, and the amounts of the air currents flowing through this gap i.e. such as heating air, convection air due to radiation heat, etc. or suction of surrounding air, etc. become uniform over the entire circumference. Accordingly, heating condition during a stretching process becomes uniform, resulting in feasibility of production of extremely stabilized film of biaxially stretched tubular film having superior physical properties. A specific example in which a biaxially stretched tubular film is made by using an apparatus of the present invention will be presented.

EXAMPLE

Production Conditions

Apparatus used: an apparatus for producing biaxially stretched tubular film with a 65 m/mφ extruder
Raw material used: polypropylene resin grade for biaxial stretching
Size of raw film: 100 mm (width)×720μ (thickness)
Stretching temperature and take-up speed: 150° C., 40 m/min.

Result

Film size: 600 mm (width)×20μ (thickness)
Fluctuations of flat width and thickness: 600 mm±1 mm, 20μ±10%

As the result of operation for producing biaxially stretched tubular films under the above-mentioned conditions, by using the above-mentioned apparatus of the present invention, production of extremely stabilized film becomes feasible without variation with lapse of time, and biaxially stretched tubular films of good physical properties and high quality could be obtained. On the other hand, a similar run was carried out for comparison, without using a cylindrical sheet of the present invention (6 in FIG. 1a). Results (fluctuations of flat width and thickness) were 600 mm±5 mm and 20μ±22%, respectively.

What is claimed is:

1. An apparatus for producing a biaxially stretched tubular plastic film that includes
   means to extrude the raw plastic film into the form of a tube,
   means to increase the diameter of the extruded tube form its extruded diameter to an enlarged maximum diameter by the introduction of inflation air into the interior of said tube, and
   a film take up means,
   means for passing heated air over the exterior surface of said extruded tube,
the improvement consisting of a flexible flow guide arrangement for guiding said heated air uniformly over the exterior of said extruded tube over that area of the tube where the diameter is changing from its extruded diameter to its enlarged maximum diameter, said flexible flow guide arrangement comprising in combination:
   (a) a circular hood extending annularly around said tube,
   (b) a plurality of spaced apart roller supports fixed around the circumference of said hood and extending in the same direction as the direction of film movement, a roller attached to the tip end of each support, each roller being positioned to contact the bubble adjacent to the point where the extruded tube is first inflated to its maximum diameter, said roller supports having sufficient elasticity to permit said rollers to swing in a radial direction relative to the central axis of the extruded tube but being resistant to distortion in a circumferential direction, and
   (c) a flexible and expandable cylindrical sheet of flexible material extending between said hood and locations on said roller supports that are close to said rollers,
whereby the distance between the exterior surface of the extruded sheet adjacent its point of maximum diameter and the interior of said flexible and expandable cylindrical sheet is maintained at an approximately constant and uniform value so as to thereby provide a uniform flow of heated air over the exterior surface of the extruded tube over that area of the tube where the diameter is changing from its extruded diameter to its enlarged maximum diameter.

* * * * *